(12) United States Patent
Zhang et al.

(10) Patent No.: US 11,598,676 B2
(45) Date of Patent: Mar. 7, 2023

(54) TUNGSTEN-RHENIUM COMPOSITE THIN FILM THERMOCOUPLE BASED ON SURFACE MICROPILLAR ARRAY WITH GAS HOLES

(71) Applicant: XI'AN JIAOTONG UNIVERSITY, Xi'an (CN)

(72) Inventors: Zhongkai Zhang, Xi'an (CN); Bian Tian, Xi'an (CN); Bingfei Zhang, Xi'an (CN); Jiangjiang Liu, Xi'an (CN); Zhaojun Liu, Xi'an (CN); Libo Zhao, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/848,314

(22) Filed: Jun. 23, 2022

(65) Prior Publication Data
US 2022/0326092 A1 Oct. 13, 2022

(51) Int. Cl.
*G01K 7/00* (2006.01)
*G01K 7/02* (2021.01)

(52) U.S. Cl.
CPC ............ *G01K 7/028* (2013.01); *G01K 7/021* (2013.01)

(58) Field of Classification Search
CPC combination set(s) only.
See application file for complete search history.

(56) References Cited

U.S. PATENT DOCUMENTS

| 5,411,600 A | 5/1995 | Rimai et al. |
| 2012/0180839 A1* | 7/2012 | Hedler ............... G01J 5/12 438/54 |
| 2018/0087973 A1* | 3/2018 | Shi ............... C04B 41/009 |

FOREIGN PATENT DOCUMENTS

| CN | 102510834 A | 6/2012 |
| CN | 102520148 A | 6/2012 |
| CN | 202974480 U | 6/2013 |
| CN | 104655306 A | 5/2015 |
| CN | 105675160 A | 6/2016 |
| CN | 108287027 A | 7/2018 |
| CN | 110042355 A | 7/2019 |
| CN | 110319945 A | 10/2019 |
| CN | 112345107 A | 2/2021 |
| CN | 113739945 A | 12/2021 |
| JP | 2007192770 A | 8/2007 |

* cited by examiner

*Primary Examiner* — Lisa M Caputo
*Assistant Examiner* — Nasir U. Ahmed

(57) ABSTRACT

Provided herein is a tungsten-rhenium composite thin film thermocouple based on a surface micropillar array with gas holes. A tungsten-rhenium thin film thermocouple is arranged on a surface of a flat alumina ceramic substrate. Two tails of the tungsten-rhenium thin film thermocouple are respectively connected to a lead wire. A surface of the tungsten-rhenium thin film thermocouple is arrayed with a plurality of micron alumina micropillars to form an alumina micropillar array. Air is filled between the micron alumina micropillars to form the gas holes. The flat alumina ceramic substrate, the tungsten-rhenium thin film thermocouple and the alumina micropillar array form a three-layered laminated structure.

7 Claims, 3 Drawing Sheets

TUNGSTEN-RHENIUM COMPOSITE THIN FILM THERMOCOUPLE BASED ON SURFACE MICROPILLAR ARRAY WITH GAS HOLES

CROSS-REFERENCE TO RELATED APPLICATIONS

This application claims the benefit of priority from Chinese Patent Application No. 202110831747.1, filed on Jul. 22, 2021. The content of the aforementioned application, including any intervening amendments thereto, is incorporated herein by reference in its entirety.

TECHNICAL FIELD

This application relates to thermocouples, and more specifically to a tungsten-rhenium composite thin film thermocouple based on a surface micropillar array with gas holes.

BACKGROUND

Since invented in 1821, the thermocouple temperature sensor has been widely used in steam temperature measurement, thermal response to explosive products, heating and measurement of surface temperature of a high-temperature object. Recently, the thermocouple fabricated based on micro-electro-mechanical system (MEMS) technology has been highly recognized owing to its simple structure, convenient manufacture, wide measurement range, high precision, small inertia and easy remote transmission of output signals.

The composite thin film thermocouple prepared by tungsten-rhenium alloy and alumina ceramics is not only suitable for the temperature measurement under a long-term high-temperature condition, but also has a miniaturized structure. This composite thin film thermocouple can be used as a temperature sensor of the material with a large Seebeck coefficient and achieve the thermal stress matching, and has an anti-oxidation effect. The thin film thermocouple can be used for the temperature measurement in high-temperature air environment. However, with respect to the temperature measurement of the molten steel, since the molten steel is prone to adhering to a surface of the thin film, or even solidify to form steel, a sharp increase in a thickness of the thin film occurs during use, which further leads to a significantly-increased thermal resistance, resulting in a failure.

Similarly, the thin film thermocouple temperature sensor cannot be directly applied to the temperature measurement of the molten steel for a long time without packaging. After packaged in a shell, the response time will be greatly extended, attenuating the response characteristic of the thin film thermocouple temperature sensor.

SUMMARY

An object of the present disclosure is to provide a tungsten-rhenium composite thin film thermocouple based on a surface micropillar array with gas holes, to solve the problems in the prior art that the adhesion of molten steel increases thermal resistance; the package shell slows down the response speed; and it fails to enable the fast-response and long-term temperature measurement of the molten steel.

The technical solutions of the present disclosure are described as follows.

This application provides a tungsten-rhenium composite thin film thermocouple based on a surface micropillar array with gas holes, comprising:
a flat alumina ceramic substrate; and
a tungsten-rhenium thin film thermocouple;
wherein the tungsten-rhenium thin film thermocouple is arranged on a surface of the flat alumina ceramic substrate; a first tail of the tungsten-rhenium thin film thermocouple is connected to a first lead wire, and a second tail of the tungsten-rhenium thin film thermocouple is connected to a second lead wire; a surface of the tungsten-rhenium thin film thermocouple is provided with a plurality of micron alumina micropillars to form an alumina micropillar array; air is filled between the plurality of micron alumina micropillars to form the gas holes; the flat alumina ceramic substrate, the tungsten-rhenium thin film thermocouple and the alumina micropillar array form a three-layered laminated structure.

Each of the plurality of micron alumina micropillars comprises a first cylinder and a second cylinder; and one end of the second cylinder is connected to the tungsten-rhenium thin film thermocouple, and the other end of the second cylinder is connected to the first cylinder; and a diameter of the first cylinder is larger than that of the second cylinder, such that a stepped structure is formed.

In an embodiment, the first cylinder has a diameter of 2 µm±10% and a height of 4.5 µm±10%; and the second cylinder has a diameter of 2.5 µm±10% and a height of 0.5 µm±10%.

In an embodiment, a distance between center axes of adjacent micron alumina micropillars is 6 µm±5%.

In an embodiment, a height of each of the plurality of micron alumina micropillars is 5 µm±8%.

In an embodiment, the tungsten-rhenium thin film thermocouple has a positive pole and a negative pole; an end of the positive pole is connected to an end of the negative pole; and at a connection between the positive pole and the negative pole, the positive pole is arranged above the negative pole.

In an embodiment, the tungsten-rhenium thin film thermocouple has a V-shaped structure; and an angle formed between the positive pole and the negative pole is 5°±10%.

In an embodiment, the positive pole consists of 97% by weight of tungsten and 3% by weight of rhenium; and the negative pole consists of 75% by weight of tungsten and 25% by weight of rhenium.

In an embodiment, a surface uniformity of the tungsten-rhenium thin film thermocouple is 8-10%.

Compared to the prior art, the present disclosure has the following beneficial effects.

The present disclosure provides a tungsten-rhenium composite thin film thermocouple based on a surface micropillar array with gas holes, a surface of the tungsten-rhenium thin film thermocouple is provided with a plurality of micron alumina micropillars to form an alumina micropillar array, so as to form a plurality of tiny semi-closed gas holes. The gas holes formed by the confined air are at a micro-scale, when a high-temperature fluid contacts the gas holes which will generate a thrust, so as to form a directional flow to reduce the massive accumulation of the molten steel on the surface of the thin film which causes a substantial increase in thermal resistance. The tungsten-rhenium composite thin film thermocouple of the present disclosure enables the fast-response and long-term temperature measurement of the molten steel.

In an embodiment, each of the plurality of micron alumina micropillars comprises a first cylinder and a second cylinder; one end of the second cylinder is connected to the tungsten-rhenium thin film thermocouple, and the other end of the second cylinder is connected to the first cylinder; and a diameter of the first cylinder is larger than that of the second cylinder, such that a stepped structure is formed, so as to form an array micro-cylinder structure to form a plurality of tiny semi-closed gas holes. Using the modification principle of the surface superstructure, when the high-temperature fluid contacts the gas holes which will generate a thrust, so as to form a directional flow to reduce the adhesion of the molten steel on the surface of the thin film and push the molten steel droplets away by the thrust, thereby reducing the solidification of the molten steel on the surface, which is conducive to test.

In an embodiment, a distance between center axes of adjacent micron alumina micropillars is 6 μm±5%, so as to form a plurality of tiny semi-closed gas holes to form a directional flow to reduce the adhesion of the molten steel on the surface of the thin film.

In an embodiment, a height of each of the plurality of micron alumina micropillars is 5 μm±8%. When the high-temperature fluid contacts the gas holes which will generate a thrust, so as to form a directional flow to reduce the adhesion of the molten steel on the surface of the thin film, thereby reducing the solidification of the molten steel on the surface, which is conducive to test.

In an embodiment, the V-shaped structure is conducive to ensure that an end of the positive pole is connected to an end of the negative pole to form a loop. A hot junction is formed at the connection to feel the temperature and generate a thermoelectric force.

In an embodiment, the size of a contact area of the positive pole and the negative pole is moderate. If the angle formed between the positive pole and the negative pole is too large, the contact area will be too large, resulting an excessively large time-temperature area of the obtained average temperature of the hot junction, which will affect a measurement accuracy. On the contrary, if the angle is too small, the hot junction will be too small, which is easy to be damaged and reduces the stability.

In an embodiment, in order to ensure the Seebeck effect, two different materials are required for thermoelectric measurement. The tungsten-rhenium alloy material system refers to the national standard C-type thermocouple, which not only ensures the high temperature performance, but also reduces the cost.

In an embodiment, the surface uniformity can ensure that the thin film is continuous and a thermal stress is low, which is conducive to work for a long time.

As mentioned above, the present disclosure provides a reasonable solution which can give full play to the advantages of the gas holes to form the directional flow. The tungsten-rhenium thin film thermocouple has a simple structure, rendering it easy to be implemented.

The technical solutions of the present disclosure will be described in detail below with reference to the accompanying drawings and embodiments.

Figure 1:
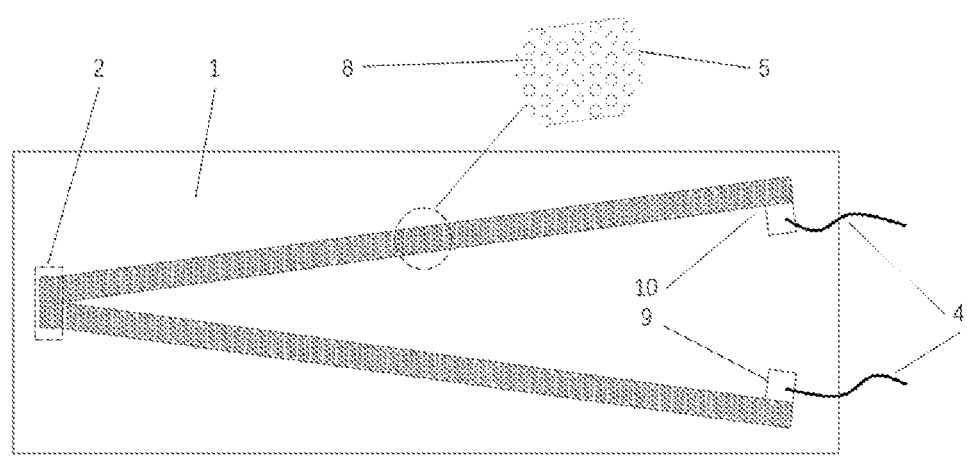
FIG. 1 is a front view of a tungsten-rhenium composite thin film thermocouple based on a surface micropillar array with gas holes according to an embodiment of the present disclosure.

In the drawings: 1, plat alumina ceramic substrate; 2, tungsten-rhenium thin film thermocouple; 3, alumina micropillar array; 4, lead wire; 5, micron alumina micropillar; 6, first cylinder; 7, second cylinder; 8, gas hole; 9, positive pole; 10, negative pole.

DETAILED DESCRIPTION OF EMBODIMENTS

The disclosure will be described completely and clearly below with reference to the accompanying drawings and embodiments to make the object, technical solutions, and beneficial effects of the present disclosure clearer. Obviously, provided below are merely some embodiments of the disclosure, which are not intended to limit the disclosure. Based on the embodiments provided herein, all other embodiments obtained by those skilled in the art without paying any creative effort shall fall within the scope of the present disclosure.

It should be noted that as used herein, all directional indications (such as "center", "portrait", "lateral", "up", "down", "front", "rear", "left", "right", "vertical", "horizontal", "top", "bottom", "inside", "outside", "one end" and "one side") are used to explain the relative position or orientation of various components under a specific posture (as shown in the accompanying drawings), which are only for the convenience of describing the present disclosure and simplifying the description, rather than indicating or implying that the indicated device or element must have a specific orientation, be constructed and operated in a specific orientation, and therefore should not be construed as a limitation of the present disclosure.

In addition, the descriptions involving "first", "second", etc. in the present disclosure are only descriptive, and should not be understood as indicating or implying their relative importance or implicitly indicating the number of indicated technical features. Thus, a feature delimited with "first", "second" may expressly or implicitly include at least one of that feature. Unless otherwise specified, "plurality" means two or more.

It should be noted that the terms "installed", "connected" and "connect" should be understood in a broad sense, unless otherwise expressly specified and limited, for example, it may be a fixed connection or a detachable connection, or an integral connection; it can be mechanical connection or electrical connection; it can be directly connected, or indirectly connected through an intermediate medium, and it can be an internal communication between two elements. For those of ordinary skill in the art, the specific meanings of the above terms in the present disclosure can be understood in specific situations.

It should be understood that the terms "comprise" and "include" used herein indicate the presence of the described features, integers, steps, operations, elements and/or components, but do not exclude the presence or addition of one or a number of other features, integers, steps, operations, elements, components, and/or sets thereof.

It should also be understood that the terminology used herein is only for the purpose of describing particular embodiments, which is not intended to limit the present disclosure. As used herein, the singular forms "a", "an" and "the" are intended to include the plural unless otherwise specified.

In addition, as used herein, the "and/or" includes three solutions, for example, the "A and/or B" includes the solution A, the solution B, and a combination thereof.

Various structural schematic diagrams according to the disclosed embodiments of the present disclosure are shown in the accompanying drawings. The figures are not to scale, some details have been exaggerated for clarity, and some details may have been omitted. The shapes of various regions and layers shown in the figures and their relative sizes and positional relationships are only exemplary, and in practice, there may be deviations due to manufacturing tolerances or technical limitations, and those skilled in the art can additionally design regions/layers with different shapes, sizes, relative positions according to actual needs.

Provided herein is a tungsten-rhenium composite thin film thermocouple based on a surface micropillar array with gas holes. On the basis of the thin film thermocouple prepared from tungsten-rhenium alloy and alumina ceramic substrate, the surface micropillar array is added to form a micro structure on the surface of the object, and the air is trapped to form the gas holes. When the high-temperature fluid contacts the micro structure, a thrust is generated due to the effect of the gas hole, so as to form a directional flow. The present disclosure uses the micro structure to transform the tungsten-rhenium film thermocouple, so that the molten steel on the surface flows directionally, so as to reduce the adhesion of the molten steel on the surface of the thin film, thereby weakening the large accumulation of the molten steel on the surface and causing the thermal resistance to rise significantly. The tungsten-rhenium thin film thermocouple in the present disclosure enables the fast-response and long-term temperature measurement of the molten steel.

Figure 2:
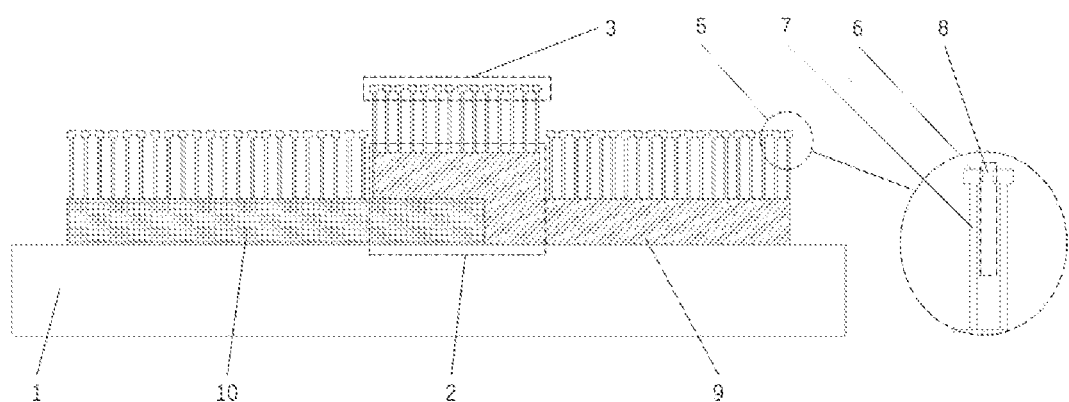
FIG. 2 is a cross-sectional view of the tungsten-rhenium composite thin film thermocouple according to an embodiment of the present disclosure.
Figure 3:
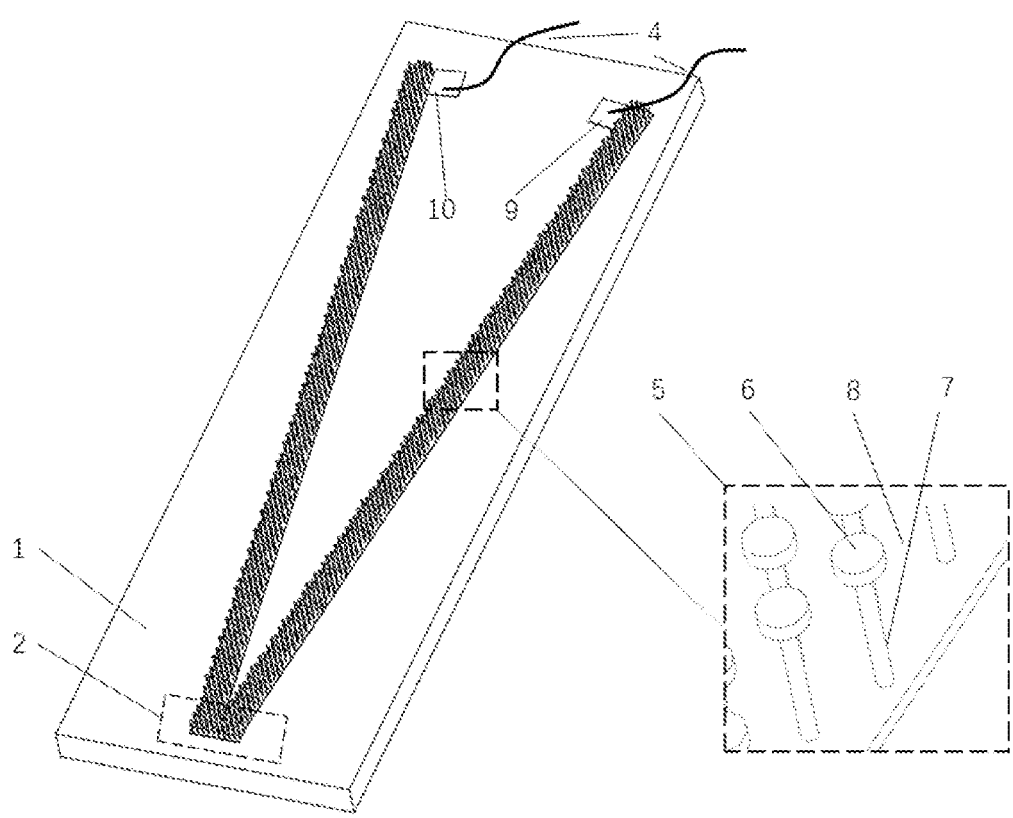
FIG. 3 schematically depicts an oblique biometric projection of the tungsten-rhenium composite thin film thermocouple according to an embodiment of the present disclosure.

As depicted in FIGS. 1-3, the present disclosure provides a tungsten-rhenium composite thin film thermocouple based on a surface micropillar array with gas holes, which includes a flat alumina ceramic substrate 1, a tungsten-rhenium thin film thermocouple 2, an alumina micropillar array 3, a lead wire 4, a micron alumina micropillar 5, a first cylinder 6, a second cylinder 7, a gas hole 8, a positive pole 9 and a negative pole 10.

Among them, the tungsten-rhenium film thermocouple 2 is arranged on a surface of the flat alumina ceramic substrate 1. A surface of the tungsten-rhenium thin film thermocouple 2 is provided with the alumina micropillar array 3. The flat alumina ceramic substrate 1, the tungsten-rhenium thin film thermocouple 2 and the alumina micropillar array 3 form a three-layer laminated structure. A first tail of the tungsten-rhenium thin film thermocouple 2 is connected to a first lead wire 4, and a second tail of the tungsten-rhenium thin film thermocouple 2 is connected to a second lead wire 4. One end of the first lead wire 4 is connected to the positive pole 9, and the other end of the first lead wire 4 is connected to a positive pole of a voltmeter. One end of the second lead wire 4 is connected to the negative pole 10, and the other end of the second lead wire 4 is connected to a negative pole of the voltmeter to read data.

Referring to FIG. 2, the tungsten-rhenium thin film thermocouple 2 includes a positive pole 9 and a negative pole 10, which has a V-shaped structure. The positive pole 9 and the negative pole 10 have the same size, and an angle formed between the positive pole 9 and the negative pole 10 is 5°±10%. The positive pole 9 consists of 97%±2% by weight of tungsten and 3%±2% by weight of rhenium, and the negative pole 10 consists of 75%±2% by weigh of tungsten and 25%±2% by weight of rhenium.

The tungsten-rhenium thin film thermocouple 2 is prepared by magnetron sputtering, with a surface uniformity of 8-10%.

Referring to FIGS. 2-3, the alumina micropillar array 3 includes a plurality of micron alumina micropillars 5 in a periodic array. Each of the plurality of micron alumina micropillars 5 comprises a first cylinder 6 and a second cylinder 7. One end of the second cylinder 7 is connected to the tungsten-rhenium thin film thermocouple 2, and the other end of the second cylinder 7 is connected to the first cylinder 6. A diameter of the first cylinder 6 is larger than that of the second cylinder 7, such that a stepped structure is formed. Air is filled between the plurality of micron alumina micropillars 5 to form the gas hole 8.

The micron alumina micropillar 5 is made of alumina. The second cylinder 7 is arranged at the middle of the micron alumina micropillar 5. One end of the second cylinder 7 is connected to the tungsten-rhenium thin film thermocouple 2, and the other end of the second cylinder 7 is connected to the first cylinder 6. A diameter of the first cylinder 6 is larger than that of the second cylinder 7, such that a stepped structure is formed.

The plurality of micron alumina micropillars 5 are arranged on the entire surface of the tungsten-rhenium thin film thermocouple 2 to form the alumina micropillar array 3. A distance between center axes of adjacent micron alumina micropillars 5 is 6 μm±5%.

The working principle of the tungsten-rhenium composite thin film thermocouple based on the surface micropillar array with gas holes of the present disclosure is described as follows.

When the molten steel drops to the surface of the alumina micropillar array 3 and contacts the micron alumina micropillars 5 to form a contact angle between the first cylinder 6 and the second cylinder 7. The air in the gas hole 8 is compressed to release part of the hot steam. The air generates an upward thrust, and the hot steam generates a tangential force, which causes the molten steel to flow in a direction along the surface of the alumina micropillar array 3. The flow direction is determined by a designed size and an accuracy of the preparation, so that the molten steel is no longer easy to adhere on the surface of the thin film or even solidify to form steel, which is conducive to reduce a sharp increase in the thickness of the thin film during use and a significant increase in the thermal resistance. The heat is transferred to the tungsten-rhenium thin film thermocouple 2 by conduction to form a temperature difference between the contact area of the positive pole 9 and the negative pole 10 and the lead wire 4, so as to generate a voltage signal through a thermoelectric effect, thereby obtaining the temperature according to a thermoelectric relationship.

The flat alumina ceramic substrate 1 is a rectangular sheet, with a length of 18 cm, a width of 2 cm and a thickness of 4 mm, which is made by sintering and pressing 99.99% by weight of solid alumina ceramics.

The micron alumina micropillar 5 is integrally formed by 3D printing additive manufacturing. A height of the micron alumina micropillar 5 is 5 μm, a distance between center axes of adjacent micron alumina micropillars 5 is 6 μm. The first cylinder 6 has a diameter of 2 μm and a height of 4.5 μm. The second cylinder 7 has a diameter of 2.5 μm and a height of 0.5 μm.

The positive pole 9 and the negative pole 10 have the same size, with a width of 0.5 cm, a length of 16 cm and a thickness of 100 μm. An angle formed between the positive pole 9 and the negative pole 10 is 5°. The positive pole 9 consists of 97% by weight of tungsten and 3% by weight of rhenium, and the negative pole 10 consists of 75% by weight of tungsten and 25% by weight of rhenium.

The tungsten-rhenium thin film thermocouple 2 is fixedly contacted with the lead wire 4 through a high-temperature conductive silver glue.

The plat alumina ceramic substrate 1, the tungsten-rhenium thin film thermocouple 2 and the alumina micro-pillar array 3 form a three-layered laminated structure.

The tungsten-rhenium thin film thermocouple prepared herein has an operating temperature of 0-1500° C. (using a drop test).

TABLE 1

| Experimental data | | | | | | | |
|---|---|---|---|---|---|---|---|
| Temperature (° C.) | Voltage (mV) | | | | | | Average voltage (mV) |
| 1505 | 58.16 | 58.16 | 58.29 | 58.05 | 58.33 | 58.06 | 58.16 |
| 1500 | 58.18 | 58.23 | 58.16 | 58.10 | 58.03 | 57.92 | 58.10 |

After the heating experiment, a Seebeck coefficient of a sensitive film is 12 μV/° C. at 1500° C. (as shown in Table 1), the Seebeck coefficient of sensitive film is calculated as:

(58.16−58.10)/(1505−1500)=12μV/° C.

As mentioned above, the tungsten-rhenium composite thin film thermocouple based on the surface micro-pillar array with gas holes provided in the present disclosure can make the molten steel on the surface flow directionally, so as to reduce the adhesion of the molten steel on the surface of the thin film, thereby weakening the large accumulation of the molten steel on the surface and causing the thermal resistance to rise significantly. The tungsten-rhenium composite thin film thermocouple enables the fast-response and long-term temperature measurement of the molten steel.

Described above are only preferred embodiments of the present disclosure and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. A tungsten-rhenium composite thin film thermocouple based on a surface micropillar array with gas holes, comprising:
    a flat alumina ceramic substrate; and
    a tungsten-rhenium thin film thermocouple;
    wherein the tungsten-rhenium thin film thermocouple is arranged on a surface of the flat alumina ceramic substrate; a first tail of the tungsten-rhenium thin film thermocouple is connected to a first lead wire, and a second tail of the tungsten-rhenium thin film thermocouple is connected to a second lead wire; a surface of the tungsten-rhenium thin film thermocouple is provided with a plurality of micron alumina micropillars to form an alumina micropillar array; a height of each of the plurality of micron alumina micropillars is 5 μm±8%; air is filled in a space between adjacent micron alumina micropillars to form the gas holes; the flat alumina ceramic substrate, the tungsten-rhenium thin film thermocouple and the alumina micropillar array form a three-layered laminated structure; each of the plurality of micron alumina micropillars comprises a first cylinder and a second cylinder; one end of the second cylinder is connected to the tungsten-rhenium thin film thermocouple; and a diameter of the first cylinder is larger than that of the second cylinder.

2. The tungsten-rhenium composite thin film thermocouple of claim 1, wherein the first cylinder has a diameter of 2 μm±10% and a height of 4.5 μm±10%; and the second cylinder has a diameter of 2.5 μm±10% and a height of 0.5 μm±10%.

3. The tungsten-rhenium composite thin film thermocouple of claim 1, wherein a distance between center axes of adjacent micron alumina micropillars is 6 μm±5%.

4. The tungsten-rhenium composite thin film thermocouple of claim 1, wherein the tungsten-rhenium thin film thermocouple has a positive pole and a negative pole; an end of the positive pole is connected to an end of the negative pole; and at a connection between the positive pole and the negative pole, the positive pole is arranged above the negative pole.

5. The tungsten-rhenium composite thin film thermocouple of claim 4, wherein the tungsten-rhenium thin film thermocouple has a V-shaped structure; and an angle formed between the positive pole and the negative pole is 5°±10%.

6. The tungsten-rhenium composite thin film thermocouple of claim 4, wherein the positive pole consists of 97% by weight of tungsten and 3% by weight of rhenium; and the negative pole consists of 75% by weight of tungsten and 25% by weight of rhenium.

7. The tungsten-rhenium composite thin film thermocouple of claim 1, wherein a surface uniformity of the tungsten-rhenium thin film thermocouple is 8-10%.

* * * * *